Dec. 3, 1940.  D. A. SMITH  2,223,644
CLAMPING DEVICE
Filed Jan. 3, 1939    2 Sheets-Sheet 1
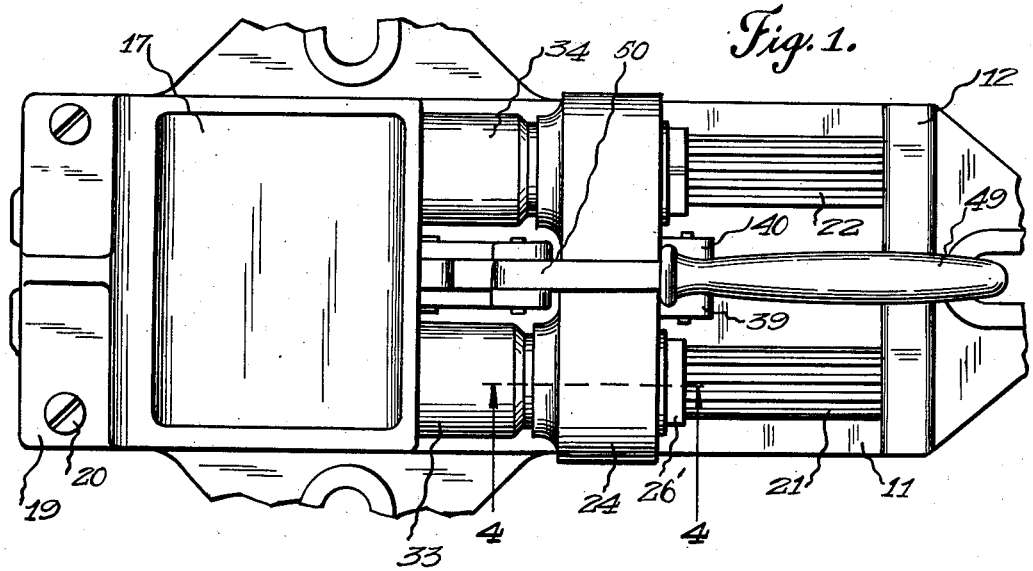
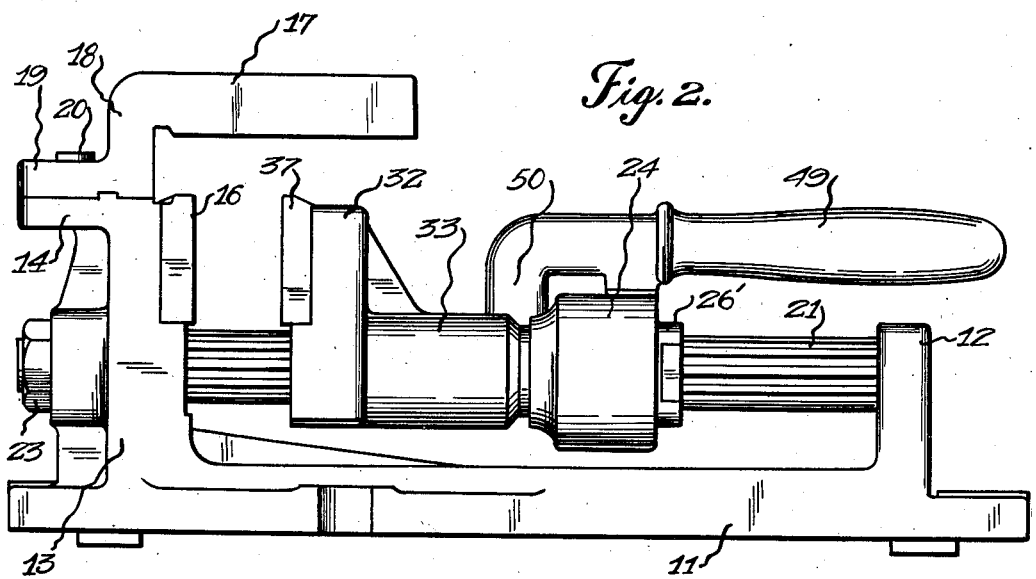
INVENTOR.
DONALD A. SMITH
BY
ATTORNEY.

Dec. 3, 1940.     D. A. SMITH     2,223,644
CLAMPING DEVICE
Filed Jan. 3, 1939     2 Sheets-Sheet 2
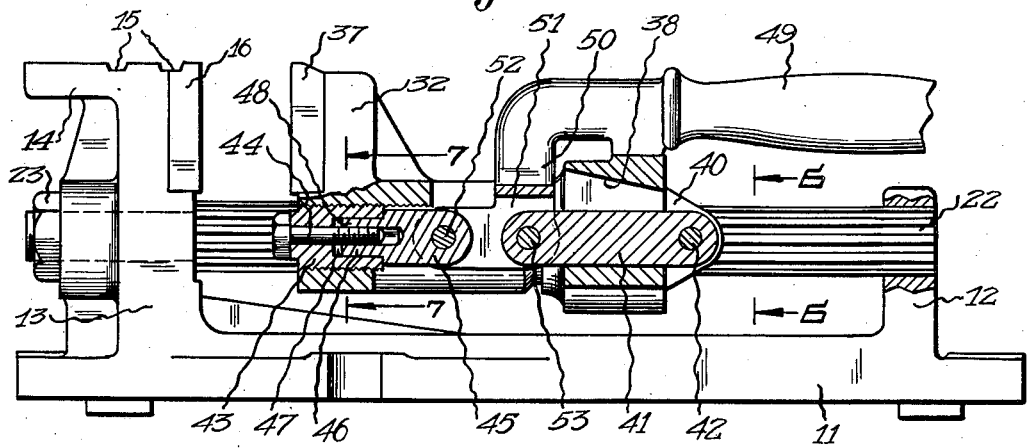
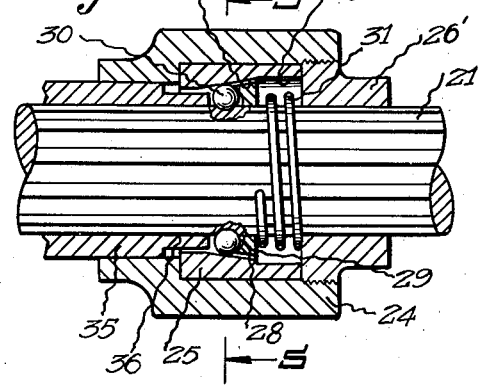
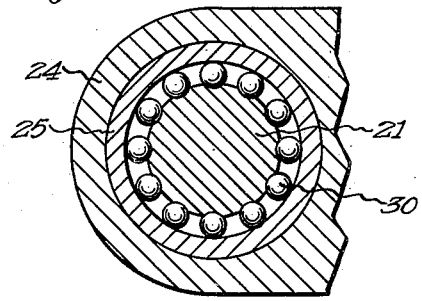
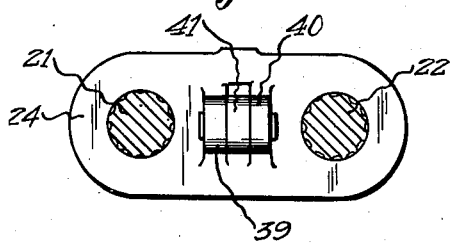
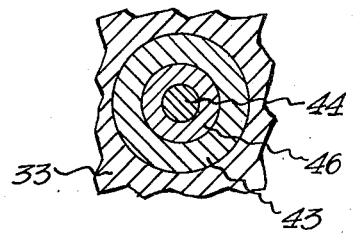
INVENTOR.
DONALD A. SMITH.
BY
ATTORNEY.

Patented Dec. 3, 1940

2,223,644

UNITED STATES PATENT OFFICE 2,223,644

CLAMPING DEVICE

Donald A. Smith, Detroit, Mich.

Application January 3, 1939, Serial No. 248,953

10 Claims. (Cl. 77—63)

My invention relates to a new and useful improvement in a clamping device adapted for clamping work pieces in position and retaining the same in such position during working operations such as drilling, reaming, and so forth.

It is an object of the present invention to provide a clamping device of this class which will be simple in structure, economical of manufacture, durable, compact, light, easily and quickly operated, and one which will effectively clamp devices of various sizes securely in position.

Another object of the invention is the provision of a clamping device of this class which may be easily and quickly moved to various positions of adjustment and automatically locked against reverse movement when thrust is delivered thereto upon movement of the same to clamping position.

Another object of the invention is the provision of a clamping device of this class in which a head is slideably mounted on guide bars and provided with means engageable with said guide bars for locking said head against movement in one direction under conditions of strain.

Another object of the invention is the provision in a clamping mechanism of a slideable head having locking means for resisting slideable movement in one direction which may be easily and quickly released.

Other objects will appear hereinafter.

The invention consists in the combination and arrangement of parts hereinafter described and claimed.

The invention will be best understood by a reference to the accompanying drawings which form a part of this specification, and in which, Fig. 1 is a top plan view of the invention with parts broken away.

Fig. 2 is a side elevational view of the invention.

Fig. 3 is a side elevational view of the invention with parts broken away, and parts shown in section.

Fig. 4 is a fragmentary sectional view slightly enlarged taken on line 4—4 of Fig. 1.

Fig. 5 is a sectional view taken on line 5—5 of Fig. 4, with parts broken away.

Fig. 6 is a sectional view taken on line 6—6 of Fig. 3.

Fig. 7 is a fragmentary sectional view taken on line 7—7 of Fig. 3.

As shown in the drawings, the invention comprises a base 11, projecting upwardly from which adjacent the rear end thereof is a supporting wall 12. Projecting upwardly from the base 11 at the opposite end is a thrust wall 13, carrying a table 14 on its upper end in which are formed grooves 15. Mounted on the forward upper face of the thrust wall 13 is a hardened wear plate 16. A guide plate 17 is provided having the downwardly offset portion terminating in the plate 19 which extends parallel to the guide plate and through which screws 20 are projected for securing the same to the bed 14. The guide plate 17 may be provided with holes drilled therein in which guide bushings and the like are projected for guiding a drill or similar tool adapted to operate upon the work piece clamped on the mechanism. Engaging at one of their ends in the wall 12 are slide rails 21 and 22 which project through the thrust wall 13 and each of which is provided with a nut 23 threaded thereon. Each of the slide rails 21 and 22 project through a head 24, this head being constructed in the same manner at each of the slide rails so that a description of one will suffice for both. Positioned in this head 24 at each of the slide rails is a bushing 25 held in position by a nut 26' threaded into the head 24. This bushing has an axially directed inner surface 26 extending through a portion of its length and the inner surface of the bushing is also provided with a tapered portion 27, this taper converging toward the forward end of the bushing. Positioned in the bushing is a presser ring 28 which has a tapered peripheral surface and provided on one of its face surfaces with an arcuate portion 29 for reception of the ring of balls 30 which surround the guide rail projected therethrough. Embracing this guide rail and engaging at one of its ends with the presser collar 28 is a coil spring 31 which engages at its opposite end of the inner face of the nut 26'.

A clamping head 32 is provided with a pair of sleeves 33 and 34 which are slideably mounted on the guide rails 21 and 22. Each of these sleeves is slideably engaged in the neck 35 which projects forwardly from the head 24. Each of these sleeves 33 and 34 is provided with a reduced portion 36 adapted to slide inwardly of the bushing 25. Mounted on the front face of the clamping head 32 is a wear plate 37.

The head 24 is provided with a central passage 38, projecting outwardly from opposite sides of which are lugs 39 and 40. A link 41 extends through this passage 38 and lies between the lugs 39 and 40 and is pivotally connected thereto at one end by the pin 42. Threaded through the clamping head 32 is a fitting 43 through which is projected a screw 44 threaded into one end of a connecting arm 45, this connecting arm having a reduced portion 46 engaging in a socket 47 mounted on the inner end of the fitting 43. The arm 45, because of the formation of the reduced portion 46, is provided with a shoulder 48 which engages the face of the fitting 43. An operating handle 49 is provided with the angularly turned portion 50 terminating in the angularly turned link forming portion 51, the end of which is pivotly connected by means of the pin 52 to the end of the connecting arm 45. A pin 53 serves to pivotly connect one end of the link 41 to the opposite end of the portion 51.

The device is used for clamping a work piece onto the wear plate 16 and 37, the table 17 being adjusted to the proper position for locating the guide bushing or the like at the proper position. In operation, the work piece would be positioned in the space between the wear plate 16 and 37. The head 24 and its connecting parts may always be freely moved forwardly, that is to the left of the drawings, the clamping head into approach to the wall 13. In practice, the forward movement of the head 24 and its connecting parts into clamping position would not be effected until the handle 49 would be tilted upwardly. This would rock the link 41 upwardly at the end which is pivoted on the pin 53, thus drawing the sleeves 33 and 34 inwardly of the bushing 25. The spring 31 normally retains the presser collar 28 pressed against the balls 30 and forced into position so that they are closely engaged between the inclined surface 27 of the bushing thereto parallel of the slide rails 21 and 22, so that any attempt at reverse movement of the head to the right of the drawings would be prevented on account of the balls moved deeper into the tapered portion of the bushing. When the handle 49 is tilted upwardly at its outer end so that the link 41 moves upwardly into the pivot 53 and thrusts the sleeves 33 and 34 into the bushing 25 the reduced portion 36 of these sleeves will engage the balls and force them rearwardly against the compression of the spring 31 and retain them in releasing position. With the balls held in this position, the clamping head 24 may be moved in both directions on the slide rails 21. When the handle is held in this position and the wear plates 16 and 37 moved into engagement with the work piece, the handle would then be tilted downwardly, thus moving the sleeves 33 and 34 out of engagement with the balls 30. These balls are then moved into locking position in response to the pressure of the spring 31 and rearward movement of the head 24 would be prevented. As the rocking of the handle moves downwardly, since this handle rocks on the pivot 52, the parts 41, 51, and 45 would be brought into alignment with each other and thus cause the head 32 to move farther into approach toward the wall 13. This movement, of course, is a slight one, but it is sufficient to securely clamp the work piece against the plate 16 and 17 when the parts are brought into engagement with the work piece prior to the tilting of the handle downwardly. After the handle moves downwardly into position shown in Fig. 3 and the parts 51, 41, and 45 assume the position of alignment, it is obvious that the toggle is on dead center so that the handle will not spring upwardly into releasing position. The amount of movement of the clamping head 32 relatively to the head 24 upon the downward movement of the handle may be adjusted by threading the fitting 43 inwardly or outwardly, thus lengthening or shortening the linkage.

It is believed obvious that the portion 51 of the handle cooperates with the link 41 to form a toggle, and that when the toggle is straightened out, the additional thrust is delivered to the member 13, and that in order to release the head 24 for reverse movement, it is necessary to break the toggle by rocking the handle 49.

The plates 37 and 16 are detachably mounted on the thrust members or jaws 13 and 32. These face plates serve to engage the work piece, and it is believed obvious that when pieces of irregular formation are used, the engaged faces of the plates 16 and 37 would be recessed and shaped to conform to the shape of the work piece so as to insure a firm and tight gripping. It is also believed obvious that the mechanism may be permanently mounted on a machine, the body of the machine serving the purpose of and constituting the base 11. This may become necessary on some types of work, but the structure shown has generally accommodated itself in the ordinary, usual operation such as reaming, drilling, broaching, milling, and the like.

Experience has shown that a clamping fixture of this type is one which is highly efficient in use, durable, and easily and quickly operated, as well as attaining the various advantages herein set out, and while I have illustrated and described the preferred form of construction, I do not wish to limit myself to the precise details of structure shown, but desire to avail myself of such modifications and variations as may come within the scope of the appended claims.

What I claim is new is:

1. A clamping machine of the class described, comprising: a base; an abutment member projecting upwardly from said base; an abutment member mounted on said base and slideable toward and away from said first mentioned abutment member; a head slideably mounted on said base and moveable toward and away from said first mentioned abutment member; means carried by said head moveable to operative and inoperative position, and adapted when moved to operative position for preventing movement of said head in the direction away from first mentioned abutment member while permitting its movement in the opposite direction; yieldable means for normally maintaining said movement preventing means in operative position; a linkage for connecting said moveable abutment member and said head, said linkage upon movement to one position moving said abutment member away from said head and when moved to another position effecting movement of said moveable abutment member toward said head for releasing said movement preventing means.

2. A clamping machine of the class described, comprising: a base; an abutment member projecting upwardly from said base; an abutment member mounted on said base and slideable toward and away from said first mentioned abutment member; a head slideably mounted on said base and moveable toward and away from said first mentioned abutment member; means carried by said head moveable to operative and inoperative position, and adapted when moved to operative position for preventing movement of said head in the direction away from first mentioned abutment member while permitting its movement in the opposite direction; yieldable means for normally maintaining said movement preventing means in operative position; a linkage for connecting said moveable abutment member and said head, said linkage upon movement to one position moving said abutment member away from said head and when moved to another position effecting movement of said moveable abutment member toward said head for releasing said movement preventing means; and means for moving said linkage to said positions.

3. A clamping machine of the class described, comprising: a base; an abutment member projecting upwardly from said base; an abutment member mounted on said base and slideable toward and away from said first mentioned abutment member; a head slideably mounted on said base and moveable toward and away from said first mentioned abutment member; means carried by said head moveable to operative and inoperative position, and adapted when moved to operative position for preventing movement of said head in the direction away from first mentioned abutment member while permitting free movement of said head toward said first-mentioned abutment member; yieldable means for normally maintaining said movement preventing means in operative position; a linkage for connecting said moveable abutment member and said head, said linkage upon movement to one position moving said abutment member away from said head and when moved to another position effecting movement of said moveable abutment member toward said head for releasing said movement preventing means; and means for moving said linkage to said positions.

4. A clamping mechanism of the class described, comprising: a base; a stationary abutment member on said base; a moveable abutment member moveable toward and away from said stationary abutment member and adapted for clamping a work piece against said stationary abutment member; a head mounted on said base and slideable toward and away from said stationary abutment member; a cam moveable to operative position and inoperative position, and adapted upon movement to operative position for preventing withdrawal of said head from said stationary abutment member; yieldable means carried by said head for normally maintaining said cam means in operative position; and means for bringing said head and said moveable abutment member into approach for effecting movement of said cam means, against the compression of said yieldable means into inoperative position.

5. A clamping mechanism of the class described, comprising: a base; a stationary abutment member mounted on said base; a slideable abutment member slideable on said base and moveable toward and away from said stationary abutment member, and adapted for clamping a work piece against said stationary abutment member; a head slideably mounted on said base; a cam operating mechanism carried by said head, and adapted for movement to operative and inoperative position, and adapted upon movement to operative position for preventing movement of said head in a direction away from said stationary abutment member; means for connecting said moveable abutment member and said head together, said moveable abutment member and said head being moveable relatively to each other within predetermined limits, said moveable abutment member upon movement toward said head a predetermined distance effecting release of said cam mechanism for permitting free movement of said head relatively to said base in either direction.

6. A clamping mechanism of the class described, comprising: a base; a stationary abutment member mounted on said base; a slideable abutment member slideable on said base and moveable toward and away from said stationary abutment member, and adapted for clamping a work piece against said stationary abutment member; a head slideably mounted on said base; a cam operating mechanism carried by said head, and adapted for movement to operative and inoperative position, and adapted upon movement to operative position for preventing movement of said head in a direction away from said stationary abutment member; means for connecting said moveable abutment member and said head together, said moveable abutment member and said head being moveable relatively to each other within predetermined limits, said moveable abutment member upon movement toward said head a predetermined distance effecting release of said cam mechanism for permitting free movement of said head relatively to said base in either direction; and means for moving said moveable abutment member toward said head said predetermined distance.

7. A clamping mechanism of the class described, comprising: a base; a stationary abutment member mounted on said base; a slideable abutment member slideable on said base and moveable toward and away from said stationary abutment member, and adapted for clamping a work piece against said stationary abutment member; a head slideably mounted on said base; a cam operating mechanism carried by said head, and adapted for movement to operative and inoperative position, and adapted upon movement to operative position for preventing movement of said head in a direction away from said stationary abutment member; means for connecting said moveable abutment member and said head together, said moveable abutment member and said head being moveable relatively to each other within predetermined limits, said moveable abutment member upon movement toward said head a predetermined distance effecting release of said cam mechanism for permitting free movement of said head relatively to said base in either direction; and means for moving said moveable abutment member toward said head said predetermined distance, and for moving said moveable abutment member away from said head.

8. A clamping mechanism of the class described, comprising: a base; a stationary abutment member projecting upwardly from said base; guide means on said base; a moveable abutment member slideable on said guide means longitudinally of said base toward and away from said stationary abutment member, and adapted for clamping a work piece against said stationary abutment member; a head slideably mounted on said guide means; a locking mechanism carried by said head and adapted for movement to operative and inoperative position, and adapted upon movement to operative position for preventing movement of said head in a direction away from said stationary abutment member, said head being freely moveable in either direction upon movement of said locking means to inoperative position; resilient means carried by said head for normally maintaining said locking mechanism in operative position; a toggle-forming linkage connecting said head and said moveable abutment member, the straightening of said toggle effecting a separation of said moveable abutment member and said head, and a breaking of said toggle member effecting a relative approach of said moveable abutment member and said head; and means carried by said moveable abutment member adapted upon movement toward said head a predetermined distance for releasing said locking mechanism and moving the same to inoperative position.

9. A clamping mechanism of the class described, comprising: a base; a stationary abutment member projecting upwardly from said base; guide means on said base; a moveable abutment member slideable on said guide means longitudinally of said base toward and away from said stationary abutment member, and adapted for clamping a work piece against said stationary abutment member; a head slideably mounted on said guide means; a locking mechanism carried by said head and adapted for movement to operative and inoperative position, and adapted upon movement to operative position for preventing movement of said head in a direction away from said stationary abutment member, said head being freely moveable in either direction upon movement of said locking means to inoperative position; resilient means carried by said head for normally maintaining said locking mechanism in operative position; a toggle-forming linkage connecting said head and said moveable abutment member, the straightening of said toggle effecting a separation of said moveable abutment member, and said head, and a breaking of said toggle member effecting a relative approach of said moveable abutment member and said head; and means carried by said moveable abutment member adapted upon movement toward said head a predetermined distance for releasing said locking mechanism and moving the same to inoperative position; and a rockable member adapted upon rocking for straightening said toggle and for breaking the same dependent upon the direction of rocking.

10. A clamping mechanism of the class described, comprising: a base; a stationary abutment member projecting upwardly from said base; guide means on said base; a moveable abutment member slideable on said guide means longitudinally of said base toward and away from said stationary abutment member, and adapted for clamping a work piece against said stationary abutment member; a head slideably mounted on said guide means; a locking mechanism carried by said head and adapted for movement to operative and inoperative position, and adapted upon movement to operative position for preventing movement of said head in a direction away from said stationary abutment member, said head being freely moveable in either direction upon movement of said locking means to inoperative position; resilient means carried by said head for normally maintaining said locking mechanism in operative position; a toggle-forming linkage connecting said head and said moveable abutment member, the straightening of said toggle effecting a separation of said moveable abutment member, and said head, and a breaking of said toggle member effecting a relative approach of said moveable abutment member and said head; and means carried by said moveable abutment member adapted upon movement toward said head a predetermined distance for releasing said locking mechanism and moving the same to inoperative position; and a rockable member adapted upon rocking for straightening said toggle and breaking the same dependent upon the direction of rocking; and adjustment means for adjusting the length of said toggle.

DONALD A. SMITH.